United States Patent Office 2,908,622
Patented Oct. 13, 1959

2,908,622
PHOTOCHEMICAL PREPARATION OF FORMALDEHYDE

John R. Bates, Swarthmore, Pa., assignor to Sun Oil Company, Philadelphia, Pa., a corporation of New Jersey No Drawing. Application June 4, 1957
Serial No. 663,362

2 Claims. (Cl. 204—158)

This invention relates to a method of making formaldehyde and more particularly concerns the photochemical preparation of formaldehyde by reacting hydrogen, methane and oxygen under the influence of mercury photosensitization.

According to the invention, hydrogen, methane and oxygen are caused to react by subjecting a mixture of these reactants, in the presence of mercury vapor, to ultraviolet light having wave length of about 1849 A. and/or 2537 A. The reaction product is composed predominantly of formaldehyde and water.

It is known that mercury vapor will absorb ultraviolet light of the approximate wave lengths 1849 A. and 2537 A. and that the unexcited or ground state mercury atoms will thereby become excited to higher energy levels. I have now found that the excited mercury atoms are capable of causing the reaction of a mixture of hydrogen, methane and oxygen with the formation of formaldehyde as the predominant organic product of the reaction. A possible mechanism for the reaction can be represented by the following equations:

(1) $Hg \rightarrow Hg^*$
(2) $Hg^* + H_2 \rightarrow 2H + Hg$
(3) $2H + 2CH_4 \rightarrow 2CH_3 + 2H_2$ or
(4) $2CH_3 + 2O_2 \rightarrow 2CH_3O_2$
(5) $2CH_3O_2 \rightarrow 2HCHO + 2OH$
(6) $OH + OH \rightarrow H_2O_2$
(7) $H + O_2 \rightarrow HO_2$
(8) $HO_2 + H_2 \rightarrow H_2O_2 + H$
(9) $HO_2 + HO_2 \rightarrow H_2O_2 + O_2$
(10) $2H_2O_2 \rightarrow 2H_2O + O_2$ Equation 1 indicates that ground state or unexcited mercury atoms are converted to excited atoms by absorption of ultraviolet light having wave length of 1849 A. or 2537 A. or both. As shown by Equation 2, the resulting mercury atoms of higher energy levels collide with and release their energy to the molecular hydrogen and thus return to ground state level. The energy absorbed by the molecular hydrogen causes it to dissociate into hydrogen atoms. At this point the hydrogen atoms may follow one of two courses: They may react with methane to yield a methyl group and hydrogen (Equation 3), or they may react with oxygen forming a $HO_2$ radical (Equation 7). The methyl group so produced may react to yield formaldehyde and hydrogen peroxide as in Equations 4, 5, and 6. In the alternate step, the hydrogen atoms formed in (2) may react with oxygen molecules to produce $HO_2$. The $HO_2$ radical is well known to react either according to Equation 8 or 9 to give two or more molecules of hydrogen peroxide. The hydrogen peroxide formed in both cases is the immediate product. However, hydrogen peroxide is known to be quite unstable, decomposing into water and oxygen according to Equation 10. It will also react with the mercury vapor present to yield mercuric oxide and water. Hence, hydrogen peroxide is not obtained in substantial amount in the final reaction product.

Methane itself may, to some extent, react with excited mercury atoms and thereby be converted to methyl atoms. However, since methane has four degrees of vibrational freedom, it is not as easily ruptured upon collision with excited mercury atoms as is hydrogen which has only one degree of vibrational freedom. For this reason, the presence of hydrogen in the reaction mixture promotes the desired reaction and increases the conversion of the reactants to formaldehyde.

The process of the invention thus comprises subjecting a mixture of hydrogen, methane and oxygen in vapor phase in the presence of mercury vapor to ultraviolet irradiation having the above-specified wave length. A suitable mercury vapor lamp is employed as the light source for supplying the necessary light energy. Since only a minor amount of mercury vapor need be present, it conveniently may be incorporated in the mixture simply by passing any one of the reactants or a mixture of the reactants over liquid mercury prior to entering the reaction zone. Mercury at room temperature has sufficient vapor pressure to supply an adequate amount of mercury vapor for the reaction mixture by operating in this manner. The mixture containing the mercury vapor is then passed into a reaction zone provided with a light source which emits light of the required wave length. Monochromatic light of either 1849 A. or 2537 A. can be employed, or dichromatic light having both wave lengths can be used. Preferably a mercury vapor lamp is installed within the reaction vessel to provide the necessary irradiation. The light energy absorbed by the mercury atoms causes them to become excited and the excited atoms upon collision with the molecular hydrogen trigger the reactions which result in the formation of formaldehyde apparently according to the mechanism described above.

Temperature and pressure conditions for carrying out the reaction are not critical and can be varied widely. Formation of formaldehyde according to the invention can readily be effected at room temperature. The reaction can also be conducted at temperatures either considerably above or below room temperature, although the temperature employed should not be so low that the vapor pressure of mercury is negligible. The pressure employed preferably should be at least atmospheric although sub-atmospheric pressures are operative. Super-atmospheric pressure likewise can be used and is advantageous in that an increase in pressure promotes the formation of formaldehyde from the gaseous reactants. The pressure should not be so high, however, that one or more of the reactants would be in liquid rather than gaseous phase.

The proportion of the reactants fed to the reaction zone preferably should be in a volume ratio such that the hydrogen is in excess of the oxygen and the methane is in excess of the hydrogen. These conditions tend to favor the production of formaldehyde and minimize the formation of water. One specific example of suitable proportions of oxygen to hydrogen to methane is 1:2:4. However, operation according to the invention is not limited to such proportions.

The following example specifically illustrates one manner of practicing the invention:

A reactor was constructed from a glass tube of 1" diameter and 18" length by disposing axially within the tube a General Electric germicidal mercury vapor lamp, plugging the ends of the tube and providing inlet and outlet connections adjacent the ends. The annular space between the lamp and the glass tube, which constituted the reaction zone, had a volume of about 150 cc. Streams of methane, hydrogen and oxygen were continuously admixed at rates, respectively, of 32.4, 16.7 and 8.6 cc./min. The mixture was passed over liquid mercury to incorporate a minute amount of mercury vapor therein and was then fed into one end of the reaction zone. The mercury vapor lamp was operated with an A.C. current at 56 volts and 0.3 ampere supplying 15 watts, and the light radiation produced was almost entirely of wave length 2537 A. The reaction zone was maintained at a temperature level approximating room temperature and at essentially atmospheric pressure. Product from the reaction zone passed as effluent into a trap cooled to a temperature of about −80° C. The product collected in the trap at such temperature was a white solid. Analysis showed that it was composed mainly of formaldehyde and water in a weight ratio of about 2 to 3.

I claim:

1. Method of making formaldehyde by photochemical reaction which comprises subjecting a vapor phase mixture of hydrogen, methane and oxygen in the presence of mercury vapor to ultraviolet light of wave length emitted by a mercury vapor lamp, the volume ratio of the reactants being such that the hydrogen is in excess of the oxygen and the methane is in excess of the hydrogen.

2. Method of making formaldehyde by photochemical reaction which comprises subjecting a vapor phase mixture of hydrogen, methane and oxygen in the presence of mercury vapor to ultraviolet light having wave length mainly of about 2537 A., the volume ratio of the reactants being such that the hydrogen is in excess of the oxygen and the methane is in excess of the hydrogen.

References Cited in the file of this patent

FOREIGN PATENTS

| | | |
|---|---|---|
| 307,521 | Great Britain | Mar. 4, 1929 |
| 307,406 | Great Britain | Mar. 4, 1929 |